United States Patent [19]
Killian

[11] Patent Number: 5,819,461
[45] Date of Patent: Oct. 13, 1998

[54] APPARATUSES FOR STEADYING A DEVICE TO BE AIMED BY A USER

[76] Inventor: Michael G. Killian, 31 Beaufort Rd., Jamaica Plains, Mass. 02130

[21] Appl. No.: 839,505

[22] Filed: Apr. 14, 1997

[51] Int. Cl.$^6$ ..................................................... F41A 21/48
[52] U.S. Cl. .................................................................. 42/94
[58] Field of Search ............................... 42/94; 89/37.01; 248/118, 276.1

[56] References Cited

U.S. PATENT DOCUMENTS

| | | | |
|---|---|---|---|
| 46,365 | 2/1865 | Kinman | 42/94 |
| 167,169 | 8/1875 | Hare | 42/94 |
| 281,338 | 7/1883 | Butler | 42/94 |
| 454,300 | 6/1891 | Sproul | 42/94 |
| 599,096 | 2/1898 | Eckman | 42/94 |
| 664,979 | 1/1901 | Taylor | 42/94 |
| 759,593 | 9/1904 | Cover | 42/94 |
| 784,390 | 3/1905 | Dunham | 42/94 |
| 798,734 | 9/1905 | King | 42/94 |
| 889,658 | 6/1908 | Brunaugh, Jr. | 42/94 |
| 915,481 | 3/1909 | Roop | 42/94 |
| 1,025,476 | 5/1912 | Mellen | 248/118 |
| 1,103,824 | 7/1914 | Page | 42/94 |
| 1,187,100 | 6/1916 | Rooth | 42/94 |
| 1,288,684 | 12/1918 | Roe | 42/94 |
| 2,119,325 | 5/1938 | Goodhart | 128/88 |
| 2,403,654 | 7/1946 | Gerdes | 248/48 |
| 2,463,107 | 3/1949 | Holroyd | 42/94 |
| 2,826,848 | 3/1958 | Davies | 42/71 |
| 3,225,656 | 12/1965 | Flaherty et al. | 89/37 |
| 3,390,477 | 7/1968 | Galbraith | 42/94 |
| 4,558,532 | 12/1985 | Wright | 42/94 |
| 4,674,472 | 6/1987 | Reis | 124/89 |
| 4,844,390 | 7/1989 | Duke | 248/118 |
| 5,111,983 | 5/1992 | Simmons et al. | 224/258 |
| 5,241,771 | 9/1993 | Caustic | 42/94 |
| 5,351,867 | 10/1994 | Vest | 224/224 |
| 5,385,322 | 1/1995 | Kim et al. | 248/118 |
| 5,410,835 | 5/1995 | Vetter | 42/94 |
| 5,481,817 | 1/1996 | Parker | 248/286.1 |

OTHER PUBLICATIONS

Advertisement for BushHawk™ II Fast–Action Camera Mount on p. 63 of Winter 1995 Outdoor & Nature Photography Magazine.

*Primary Examiner*—Charles Jordan
*Assistant Examiner*—Meena Chelliah
*Attorney, Agent, or Firm*—Edward W. Porter

[57] ABSTRACT

An apparatus helps a user steadily hold a pointable device, such as a camera, a telescope, or a gun. It includes an arm rest having upper and lower portions, respectively, for supporting an upper arm from below and for restricting rotation of a lower arm bent at the elbow. The upper and lower arm holding portions each can press against a user's arm from enough directions to retard motion of the arm perpendicular to its length. The upper and lower portions can include cylindrical inner surfaces angled to bend an arm at least sixty degrees at the elbow. A support holds the arm rest from below. The support can include a rigid elongated member. In some embodiments, this member reaches to the ground. In many others, it rests against a user's hip and has a lower end designed to be supported by a pocket, belt, or Velcro pad on the user's hip. It is preferred that the elongated member slant down and in toward the hip from the arm rest at an adjustably fixed angle and that the lower arm holding portion be supported in a diagonal direction which points both up and in toward a position in front of the user's face. The apparatus often includes a mounting for the pointable device, preferably one which can be rotated with two degrees of freedom, and one the height of which relative to the arm rest can be adjustably fixed.

30 Claims, 10 Drawing Sheets

APPARATUSES FOR STEADYING A DEVICE TO BE AIMED BY A USER

FIELD OF THE INVENTION

The present invention relates to apparatuses for steadying a device which can be carried and aimed by a user, such as, for example, a camera, a pair of binoculars, a bird watching telescope, or a gun.

BACKGROUND OF THE INVENTION

There are many types of portable devices which users normally aim by hand, such as cameras, binoculars, telescopes, and guns. When using such devices it is often desirable to have some means of support to prevent the normal vibration of a user's arm from decreasing the user's ability to steadily aim and support such a device. For example, when one is looking through a high magnification bird-watching telescope, such vibration can become quite annoying, particularly because the high magnification of such scopes amplifies the visual effect of such vibration to one who is looking through them.

The prior art includes a plurality of apparatuses for steadying portable devices which are to be aimed by a user. For example, tripods are commonly used to steady cameras or telescopes. In many situations, tripods function admirably for this purpose. However, although many tripods are reasonably portable, setting a tripod up and taking it down often takes too much time for someone, such as a bird watcher or a hunter, who wants to be able to stop and quickly, but steadily aim at an object of interest while walking through woods and brush.

The prior art also includes a plurality of other devices for supporting such aimable devices off of a user's body. For example a plurality of U.S. Patents disclose devices for supporting the arm of a person aiming a rifle. These include U.S. Pat. Nos. 664,979 to M. Taylor entitled "Ann Rest For Firearms", 784,390 to W. S. Durham, entitled "Ann Rest", 759,593 to J. E. Cover entitled "Gunner's Arm Rest" and 3,390,477 to J. O. Galbraith entitled "Supporting Device For Sighting Firearms". All of these patents disclose devices which attach to a user's waist, hips, or torso for supporting the arm which a marksman uses to holds the front of a rifle. Although these devices may be well suited for certain applications, for many applications, particularly those relating to cameras, binoculars and telescopes, they often are either not appropriate or do not provide a sufficient degree of steadiness.

The prior art also discloses devices such as that shown in U.S. Pat. No. 5,111,983 issued to Simmons et al. entitled "Camera Stabilizing Device", for stabilizing an arm being used to hold a camera. Although this device might be beneficial for some purposes, it fails to provide the degree of steadiness desirable for other applications.

SUMMARY OF THE INVENTION

It is an object of the present invention to provide apparatuses for steadying a device to be aimed by a user.

It is a more particular object of the invention to provide such apparatuses which can be easily carried by a user as he or she walks and which enables the user to rapidly and steadily aim such an aimable device.

It is another object of the present invention to provide such apparatuses which enable a user to aim devices with a high degree of steadiness.

According to one aspect of the present invention, an apparatus or tool is provided for helping a user to more steadily hold a portable pointable device, such as a camera, a pair of binoculars, a telescope, or a gun, which is to be aimed by the user's hand. The apparatus comprises an arm rest including an upper arm holding portion and a lower arm holding portion. The upper arm holding portion has a surface for supporting the user's upper arm from below; and the lower arm holding portion has a surface for restricting rotation of the user's lower arm when the arm is bent at the elbow. The apparatus further includes a support connected to the arm rest for supporting the arm rest from below.

Preferably the apparatus includes means for fixing the upper and lower arm holding portions relative to each other, and each of those arm holding portions includes means for pressing against the portion of a user's arm within it from a sufficient number of directions so as to retard motion of the arm portion it holds in any direction perpendicular to the length of that arm portion. The means for pressing against the user's arm can include one or more air bags which can be inflated or deflated by the user.

The upper and lower arm holding portions can each include a generally cylindrical inner surface. The axes of these two cylindrical surfaces form an angle such that an arm within them is bent at least sixty degrees at the elbow. In one such embodiment, the upper arm holding portion extends substantially all the way around the arm, but the lower arm holding portion does not. Instead the lower arm holding portion has an opening which extends in a direction parallel to the axis of its cylindrical surface, so a user can insert and remove his or her lower arm from the lower arm holding portion by rotation at the elbow. In some embodiments, this opening is in the side of the lower arm holding portion which faces away from the user's shoulder, so the user can insert and remove his or her lower arm from the lower arm holding portion by bending it toward and away from his or her shoulder.

In many embodiments the arm rest's support includes a rigid elongated member connected at one end to the arm rest. This elongated member often is of a proper length to extend to the hip of the user. In such embodiments the rigid elongated member can have connected to its bottom a flat, downward-extending portion for fitting into a front pocket of a pair of pants or behind a belt, and a horizontal surface above the downward-extending surface designed for catching the top of such a belt or pocket. In such embodiments it is preferred to have the flat downward-extending portion mounted to rotate relative to the end of the elongated member. In some embodiments, the rigid elongated member has a Velcro strip (made of either hook or loop material) attached to its lower end designed to attach to a corresponding mating Velcro strip (made, respectively, of either loop or hook material) attached to a user's hips.

Preferably the apparatus includes means for mounting the rigid elongated member at a fixed angle relative to the arm rest, so the elongated member slants down and in from the arm rest toward a user's hips when the arm rest is held out in front of a user's chest. Preferably the user can adjustably fix the angle of the slant and preferably the elongated member includes means for enabling the user to adjustably fix the length of the elongated member between the arm rest and his or her hips.

In many embodiments the arm rest's support includes means for supporting the lower arm holding portion in a diagonal direction which points both upward from the elbow and toward a position in front of the user's face.

In some embodiments the rigid elongated member mounted on the arm rest is of sufficient length to extend to the ground when the arm rest is approximately at the user's mid-chest or above.

In many embodiments, the apparatus further includes a mounting for the pointable device to be aimed by the user. Preferably, such a mounting can be rotated with two degrees of freedom. In some embodiments, means are provided for adjustably fixing the height of the mounting relative to the arm rest. In some embodiments, the mounting for the pointable device includes an elongated member supported by the arm rest's support which can extend upward at an adjustably fixable angle.

According to another aspect of the invention an apparatus for helping a user to more steadily hold an optical device to be aimed by the user's eye includes a mounting for such an optical device; and a support for supporting the mounting at least as high as the user's mid-chest so the user can look through the optical device to aim it. The support also includes means for supporting the mounting from the user's hip, but not against the user's chest. These means including a rigid elongated member extending between the mounting and the hip of the user. This device can have a separate arm rest, such as one supporting the users arm on both sides of the elbows as mentioned above.

DESCRIPTION OF THE DRAWINGS

These and other aspects of the present invention will become more evident upon reading the following description of the preferred embodiment in conjunction with the accompanying drawings, in which.

DETAILED DESCRIPTION OF PREFERRED EMBODIMENTS

Figure 1:
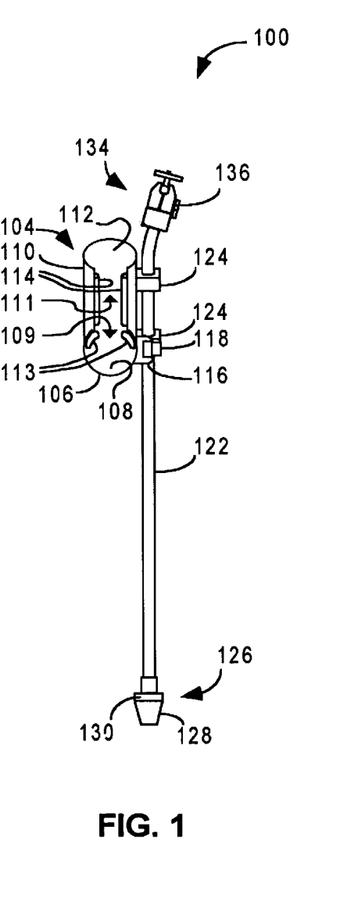
FIG. 1 is a view of a steadying apparatus according to one embodiment of the present invention which is designed to be worn on a user's left arm shown from the direction that faces the shoulder of user wearing it.
Figure 2:
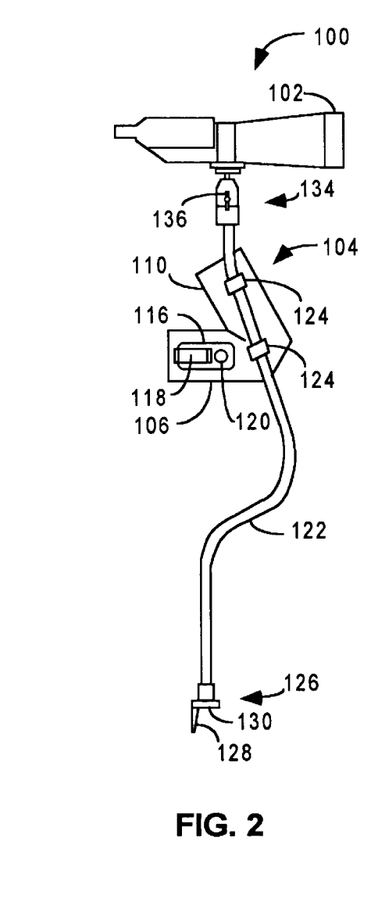
FIG. 2 is a view of the steadying apparatus of in FIG. 1 shown from the right side in FIG. 1.

FIGS. 1 and 2 illustrate a steadying device 100 which is a relatively simple embodiment of the present invention. This apparatus is designed to help a user to more steadily hold a portable pointable device to be aimed by the user's hand. In FIG. 2 the pointable device is a bird-watching telescope 102. Other pointable devices can be mounted on the invention as well, including other optical devices through which a user can look, such as a camera, other types of telescopes, or a pair of binoculars. Non-optical pointable devices can also be used with the invention, such as, for example, guns.

The steadying device 100 includes an arm rest 104. This arm rest includes an upper arm holding portion 106 which has a surface 108 for supporting the user's upper arm from below. The arm rest also includes a lower arm holding portion 110, which has surfaces 112 and 114 for restricting rotation of the user's lower arm when that lower arm is bent at the elbow.

In FIG. 1 the arm rest is comprised of a single molded plastic shell in which the upper and lower arm holding portions each have a generally cylindrical inner surface 108 and 112, respectively. The cylindrical surfaces of the upper and lower arm holding portions each have an opening 109 and 111, respectively, which extends in a direction parallel to the axis of each such cylindrical surface to allow the user to insert his upper and lower arms. The molded joint between the two arm holding portions serves to fix the angle between them. In FIG. 1 the axis of the lower arm holding portion's cylindrical surface 112 is bent back approximately one hundred and twenty degrees from being collinear with the axis of the upper arm holding portion's cylindrical surface 108. In other embodiments of the invention, the angle between the upper and lower arm holding portions can vary, but normally it will be enough to cause a user whose arm is in both portions of the arm rest to bend his or her elbow by at least sixty degrees so the user's hand will be able to help aim the pointable device mounted on the invention's steadying apparatus.

The upper and lower arm holding portions also each include inflatable air bags 113 and 114, respectively. The user can selectively pump air into these air bags by means of a pump 116, which has a pump lever 118. The pump also has a quick release button 120 connected to a quick release valve, to allow the user to selectively quickly release air from the air bags. Tubes, not shown in the figures, connect each of the two air bags 113 and the two air bags 114 to the pump 116 and its quick release valve.

When a user's arm is placed within the upper and lower arm holding portions and the user inflates the air bags 113 and 114 of each such arm holding portion, the two air bags 113 will expand and press against the users arm from above and on both sides, pressing the arm firmly down against the bottom side of the upper arm holding surface's inner cylindrical surface 108. This will cause the arm to be firmly pressed from enough directions so as to retard the arm's motion in any direction perpendicular to the upper arm's axis. Similarly the inflation of the air bags 114 in the upper arm holding portion 110 will cause those air bags to press against the lower arm from the direction nearest the shoulder on both sides, causing the other side of the lower arm to be pressed against the lower arm holding portion's inner cylindrical surface 112 on the side of that surface which is furthest away from the user's shoulder. This pressure on the lower arm from a plurality of directions will retard the lower arm's motion in any direction perpendicular to the length of that lower arm. The steadying apparatus's ability to firmly hold both the upper and lower arm of a hand used to aim a pointable device, greatly increases the steadiness with which that hand can aim such a device.

Figure 4:
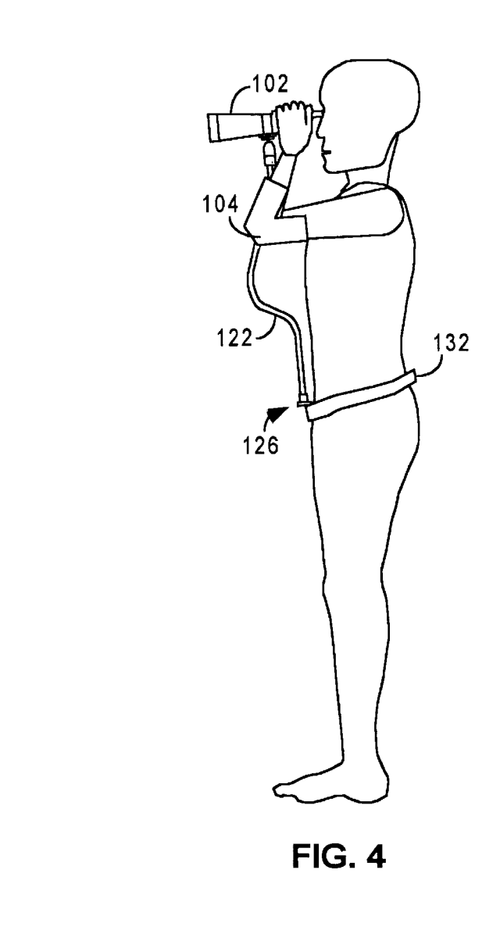
FIG. 4 shows a user employing the steadying apparatus of FIG. 1 to steady a pointable device he is aiming while the steadying apparatus is supported on his belt.

The steadying apparatus includes a support 122 for supporting the arm rest 104 from below. In the embodiment of FIGS. 1 and 2 this arm rest support is connected to the arm rest by two permanent fixed connections 124. The arm rest support 122 is a rigid elongated member formed, for example, from an aluminum tube, of a proper length to extend from the arm rest to a user's hip when the arm rests is held by the support at or above the user's mid-chest, as is shown in FIG. 4.

The inventor has found that supporting the weight of a user's arm and the pointing device from a user's hip is superior to supporting that weight from a user's shoulder or chest because it tends to isolate the arm rest and pointable device from the motion of the user's chest caused by breathing.

The arm rest support has a pocket-belt catch 126 connected to its bottom. This catch includes a flat, downward-extending portion 128 for fitting into a front pocket of a pair of pants or behind a belt; and a horizontal surface 130, above the downward-extending portion, designed for catching the top of such a belt or pocket. In FIG. 4 the catch 126 is shown catching the upper surface of the front portions of a user's belt 132, so as to hold the bottom of the arm rest support 122 up against the front of a user's hip.

The steadying apparatus of FIGS. 1 and 2 also includes a mounting 134 for the pointable device, such as the optical device 102. When the steadying apparatus is in use steadying the pointable device, as in FIG. 4, this mounting is supported by the arm rest support 122. In the embodiment shown in FIGS. 1 and 2 the mounting 134 is, itself, mounted on a continuation of the once piece metal tubing from which the arm rest support 122 is made. The mounting 134 includes means for supporting the pointable device mounted on it so that device can be rotated with two degrees of freedom so as to better allow the hand of the user supported by said arm rest to aim that pointable device. In the embodiment of FIGS. 1 and 2 the mounting 134 is a ball joint mounting with a thumb screw 136 to allow the user to selectively loosen and tighten the ball joint so as to selectively allow the pointable device 102 to either rotate in multiple dimensions or to be tightly fixed.

Figure 3:
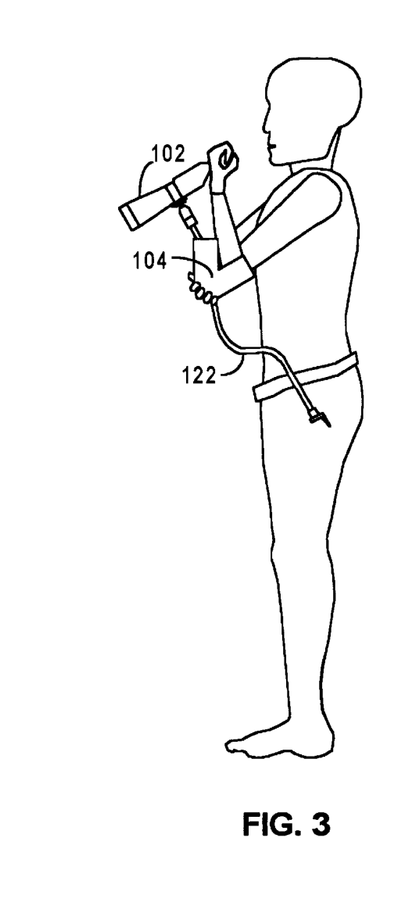
FIG. 3 shows a user placing the steadying apparatus of FIG. 1 on his arm.
Figure 5:
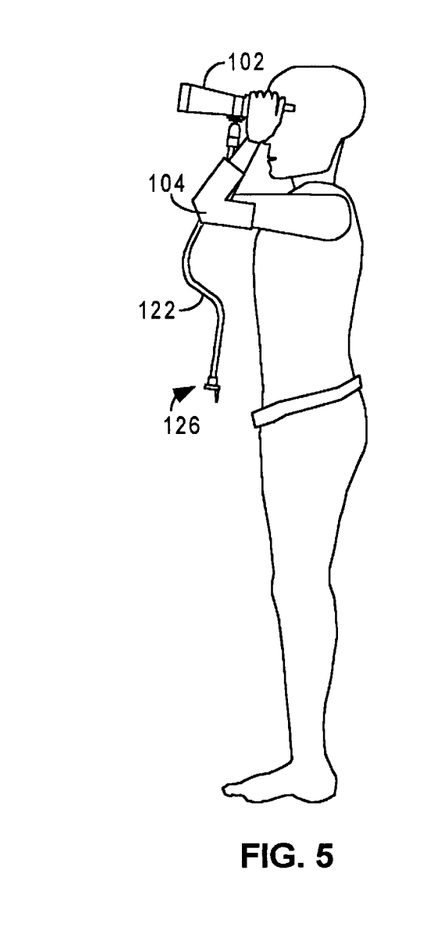
FIG. 5 is similar to FIG. 4, except that it shows how a user can lift the bottom of the steadying apparatus up so at to place it upon, or remove it from, support on the user's belt.
Figure 6:
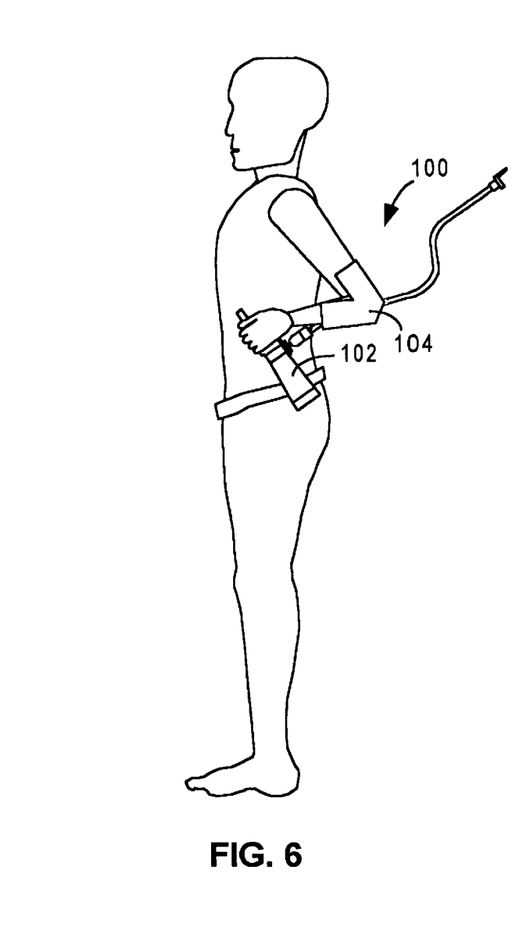
FIG. 6 shows how the user in FIGS. 4 and 5 can carry the steadying apparatus and the pointable device mounted upon it at his side while walking.

FIG. 3 shows how a user can place the arm rest of the steadying apparatus of FIGS. 1 and 2 upon his or her arm, by pressing his or her elbow into the openings 109 and 111 of the upper and lower arm holding portions, respectively. The openings 109 and 111 are narrower than the width of the average upper and lower arms, respectively, but the molded plastic shell of which the arm rest is made is flexible enough to allow the cylindrical surfaces of both the upper and lower arm holding portions to deform so as to allow the user's arm to be forced through such openings. During such putting on of the arm rest the air bags 113 and 114 should be deflated. Once the upper and lower arms are in the arm rest, as shown in FIGS. 4–6, the resilience of the arm rests molded shell tends to hold then in the arm rest. To tighten this hold and to make it more firm, the user can pump up the air bags 113 and 114 by repeatedly pushing on the pump lever 118 shown in FIGS. 1 and 2. When the user wants to take the arm rest off, he or she should deflate the air bags by pushing the quick release button 120 and then pull his or her elbow out of the arm rest through the openings 109 and 111.

Figure 13:
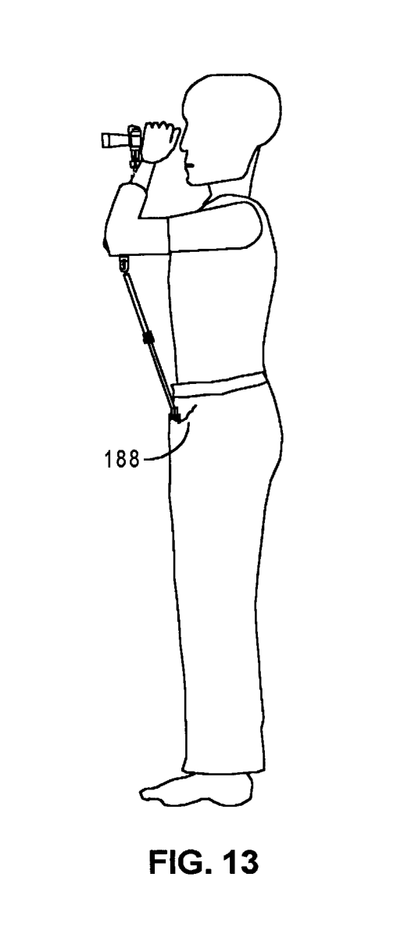
FIG. 13 is similar to FIG. 11 except that it is taken from the user's other side and except that in it the steadying apparatus is supported from a pant pocket on the user's hip.

As stated above, FIG. 4 shows how a user can use the steadying device to steadily hold a pointable device 102 by catching the pocket-belt catch 126 upon the top of the user's belt 132, so as to support the arm rest high enough to bring the pointable device up toward the user's eye so he or she can aim it at an object of interest. As is indicated in FIG. 13 with regard to another embodiment of the invention, the pocket-belt catch 126 can be supported by a pocket as well as a belt. The steadying device not only supports the weight of the pointable device but also supports the weight of and firmly holds both the upper and lower arm of the user, so the hand will be able to aim the pointable device with a minimum of vibration.

FIG. 5 shows how the user can easily attach or de-attach the pocket-belt catch from his or her hip. De-attaching the catch is done simply by lifing and rotating the user's elbow up so the catch is removed from behind the belt or from within the pocket which is holding it against the user's hip. Attaching the pocket-belt catch is done by moving the user's elbow in the opposite direction so the catch will be caught in the user's belt or pocket.

FIG. 6 shows how the steadying apparatus 100 and the pointable device 102 mounted on it can comfortably rest down by the user's side when the pocket-belt catch is removed from a position against a user's hip. The firm fit of the arm rest keeps it from falling off the user's elbow, enabling the user to let go of the pointable device with his hand, without dropping it. With the steadying device in this position the user can easily walk through woods and brush. When the user sees an object of interest, such as, for example, a bird, he or she can then quickly lift the steadying apparatus up, as shown in FIG. 5, catch its bottom on a belt or pocket, as shown in FIG. 4, and then aim the pointable device 102 at the object of interest.

FIGS. 7–12 show a steadying device 100A according to an alternate embodiment of the present invention. In the steadying device 100A, the arm rest 104A comprises an upper arm holding portion 106A having an inner cylindrical surface 108A which extends all the way around an arm placed within it. This prevents such an arm from being withdrawn from the upper arm holding portion in a direction perpendicular to the axis of the arm holding portion's cylindrical surface.

Figure 7:
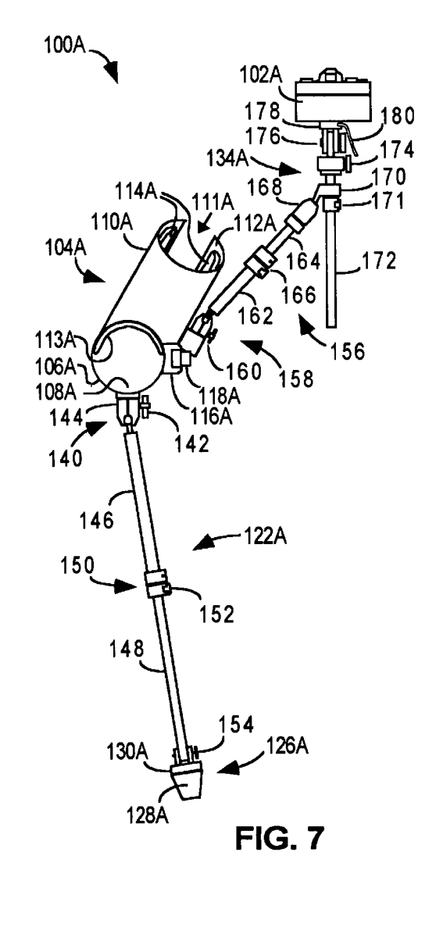
FIG. 7 illustrates a steadying apparatus according to an alternate, more adjustable, embodiment of the invention which is designed to be worn on a user's left arm, shown from the side which would face a user when wearing it.
Figure 8:
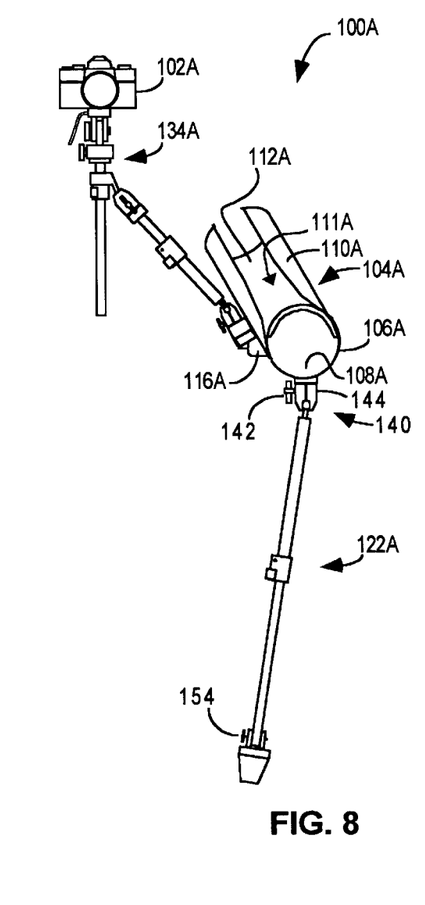
FIG. 8 illustrates the steadying apparatus of FIG. 7 from the opposite side, that which faces away from the user when wearing it.
Figure 9:
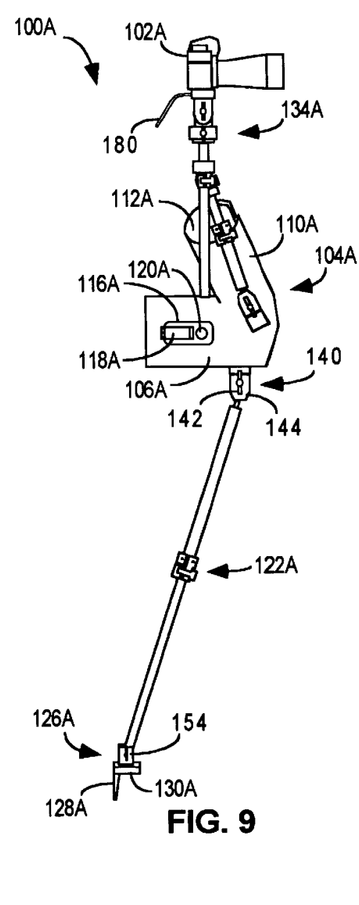
FIG. 9 illustrates the steadying apparatus of FIG. 7 from the right side of FIG. 7.
Figure 10:
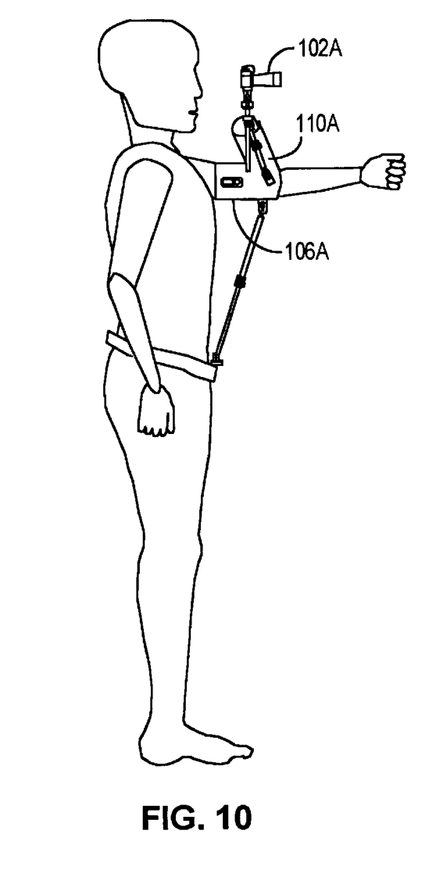
FIG. 10 illustrates a user partially wearing the steadying apparatus of FIG. 7, with his upper arm in the upper arm holding portion of the apparatus's arm rest and with his lower arm not yet bent back into the lower arm holding portion of the arm rest.
Figure 11:
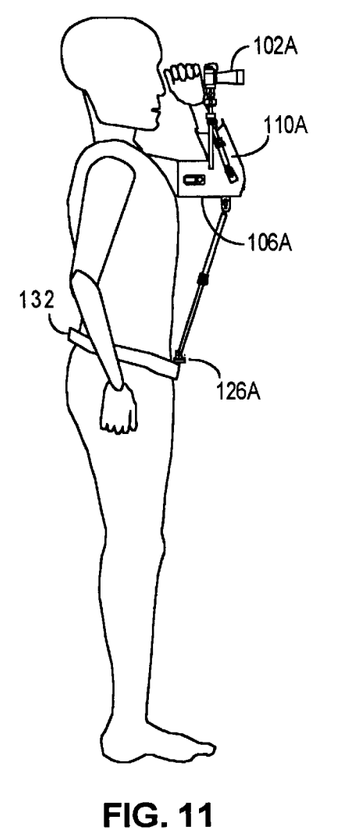
FIG. 11 is similar to FIG. 10, except the user has bent his lower arm back into the lower arm holding portion of the steadying apparatus's arm rest.

The cylindrical inner surface 112A of the lower arm holding portion 110A shown in FIGS. 7–9 has an opening 111A similar to the opening 111 shown in FIGS. 1 and 2, except that it is on the front side of the arm rest, that which faces away from a user's shoulder during use. This enables a user to stick an straightened arm through the upper arm holding portion 106A as shown in FIG. 10, and then rotate the forearm back through the opening 111A so as to fit the forearm into the lower arm holding portion 110A, as shown in FIG. 11.

FIG. 8 shows the steadying apparatus 100A from the side which is away from a user's shoulder during use. As can be seen in that figure, the opening 111A is wider at its bottom near its connection to the upper arm holding portion. This widening is provided because a user's forearm is much wider near the elbow than it is nearer the wrist, and to aid the process of deforming the plastic molded shell of the lower arm holding portion when a forearm is being inserted into it.

The apparatus 100A includes a single air bag 113A on upper arm holding portion and two air bags 114A on the lower arm holding portion. These are inflated by a pump 116A and deflated by a quick release button 120A similar to the corresponding devices shown in FIGS. 1 and 2. Once a user has inserted his arm into both the upper and lower arm holding portions, as shown in FIG. 11, he or she can then inflate the air bags to firmly hold that arm bent at the angle between the axis of the upper and lower arm holding portions. In the embodiment of FIGS. 7–12 this angle is approximately one hundred and twenty degrees.

In the apparatus 100A shown in FIGS. 7 through 12 the arm rest support 122A is connected to the bottom of the arm rest 104A through a ball joint 140 which has a thumbscrew 142 to allow a user to selectively fix the angle, in planes parallel and perpendicular to the axis of the upper arm holding portion, at which the arm rest support extends down from the arm rest. Like all the ball joints shown in this specification, the ball joint 140 includes a casing 144 which is free to rotate when the thumbscrew 142 is loose to increase the angle at which attachments to the ball joint can be pointed.

It is intended that the user will normally fix the thumbscrew on the ball joint 140 so the arm rest support 122A slants down and in toward a user's hips from the end of the upper arm holding portion which is away from a user's shoulder during use when the arm rest is held out in front of a user's chest. This angle is indicated in FIG. 11.

It is also intended that the user will fix the thumbscrew 140 so the arm rest will be supported such that the lower arm holding portion 110A of the arm rest 104A will extend in a diagonal direction which points both upward from the upper arm holding portion 106A and toward a position in front of the user's face when the arm rest is supported from the users hip and is out in front of the user's chest as is shown in FIG. 11. This diagonal tilt of the lower arm holding portion, shown in FIGS. 7 and 8, allows the hand of an arm supported in the steadying apparatus 100A to be placed in front of the user's face where it can best aim a pointable device, such as the camera 102A shown in FIGS. 7–12, in front of a user's eyes without the need to turn or bend the user's neck to the side. The cylindrical inner surface 112A of the lower arm support includes a portion which supports the user's lower arm from below when it is placed within the lower arm holding portions at the diagonal angle shown in FIGS. 7 and 8.

The arm rest support 122A shown in FIGS. 7–12 includes telescoping means including an outer tube 146, and a slighly narrower inner tube 148 designed to slide within the outer tube so as to allow the length of the support 122A to be slidably varied, or telescoped. The telescoping means also includes a compressing device, or clamp, 150, similar to that found on many tripods, which clamps the lower end of the outer tube, which is split to facilitate such compression. The clamp 150 has a latch 152 which can be undone to remove the compression. When the latch 152 is in the position shown in FIGS. 7 and 8 the lower end of the outer tube is compressed around the inner tube preventing telescoping, temporarily fixing the length of the arm rest support. When the latch 152 is undone, the compression is removed, allowing the inner tube to slide, varying the length of the arm rest support. This allows the length of the arm rest support to be varied for use by different users or to allow the pocket-belt catch 126A at the bottom end of the arm support to be used with pockets or belts of differing heights. It also allows the user to vary the height of the arm rest so as to vary the height of the pointable device mounted on the steadying apparatus 100A relative to the user's eye so as to allow for viewing objects of differing heights, although, as will be discussed below, the apparatus has better means for making such adjustments.

In the steadying apparatus 100A the pocket-belt catch 126A is similar to that of the apparatus 100 shown in FIGS. 1 and 2, except that it is mounted to adjustably pivot on the end of the arm rest support 122A about a tightenable screw 154. This allows the downward-extending portion 128A of the catch to maintain a relatively vertical orientation and the horizontal surface 130 to remain a relatively horizontal orientation even when the angle of the arm rest's elongated member is changed. It also allows the angle of the downward-extending portion 128A to be varied to help it squeeze into desired places.

The steadying apparatus 100A includes an elongated member 156 which forms a mounting arm. The mounting arm 156 is attached to the side of the lower arm holding portion 110A of the arm rest 104A, meaning that it, like the arm rest it is attached to, is supported by the arm rest support 122A. The mounting arm is intended to extend in a direction which is generally upward when arm rest is in use. It is attached to the arm rest by a ball joint 158 similar to the ball joint 140 which is connected to the arm rest support. The ball joint 158 has a thumbscrew 160 which allows the user to adjustably fix the angle at which the mounting arm extends upward. Like the arm rests support, the mounting arm has telescoping means comprised of an outer tube 162, an inner tube 164 which slides within the outer tube to vary the mounting arm's length, and a clamp 166 which can selectively fix the length of the mounting arm.

Attached to the upper end of the mounting arm 156 is a ball joint 168 which allows a mounting sleeve 170 to be selectively rotated and then fixed relative to the top of the mounting arm. A vertical shaft 172 of an adjustable mounting 134A similar to that found in many camera tripods slides within the mounting sleeve 170. The mounting sleeve has a compression clamp 171 similar to those used on the clamps 150 and 166 to allow the user to selectively fix height of the mounting shaft relative to the mounting sleeve. The mounting 134A also includes a horizontal swivel 174 having a thumbscrew which can be tightened to fix its angle. On top of the horizontal swivel, the mounting 134A includes a vertical swivel 176. The swivel 176 also includes a thumbscrew which can be tightened to fix its angle. On top of the vertical swivel is located the mounting plate 178 upon which a pointable device can be attached. The mounting plate 178 also includes a small arm 180 which can be used to point it.

The combination of the mounting arm's attachment to the arm rest through the ball joint 158, the telescoping length of the mounting arm, the ball joint mounting 168 of the mounting sleeve 170, the adjustable height of the mounting shaft 172 relative to the mounting sleeve, and the horizontal and vertical swivels of the mounting 134A provide great flexibility in the position of the pointing device. Normally the user will fix the angles of the ball joints 158 and 168 and the length of the mounting arm 156 to provide the best position for a given pointing device relative to the arm rest, and then leave those angles and that length fixed while using the steadying apparatus for the given pointable device, unless use indicated adjustments are needed. The clamp 171 and the horizontal and vertical swivels 174 and 176, on the other hand, are intended to have their positions adjusted much more frequently to compensate for the varying height and angles of different objects the pointable device is aimed at.

As stated above, FIG. 10 shows how a user can place his arm straight through the upper arm holding portion 106A, and FIG. 11 shows how the user can then bend his arm back toward his or her shoulder to insert it, through the opening 111A shown best in FIG. 8, into the lower arm holding portion 11A. An opposite procedure can be used to remove the arm from the apparatus. FIG. 11 shows the position of the steadying apparatus 100A during actual use in aiming a pointable device such as the camera 102A.

Figure 12:
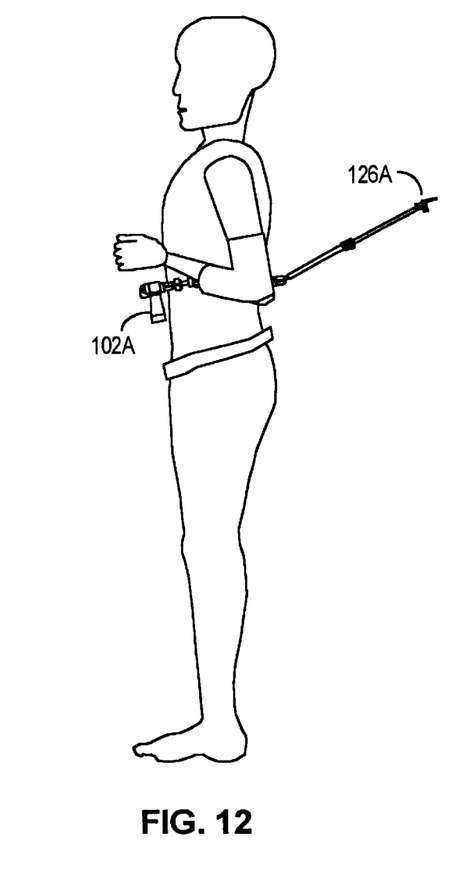
FIG. 12 shows the user of FIGS. 10 and 11 from the other side with the steading apparatus and the pointable device mounted upon it down by the users side, similar to the poise shown in FIG. 6.

FIG. 12 shows how the apparatus 100A can be rested by a user's side when not in use in a manner similar to that shown for the apparatus 100 in FIG. 6. The pocket-belt catch 126A can be inserted and removed from a belt or pocket in much the same manner as is discussed above with regard to FIG. 5.

FIG. 13 is similar to FIG. 11, except that it shows the steadying apparatus 100A from the other side and except that it shows the pocket-belt catch being supported against a user's hip by a front pocket 188 rather than a belt.

Figure 14:
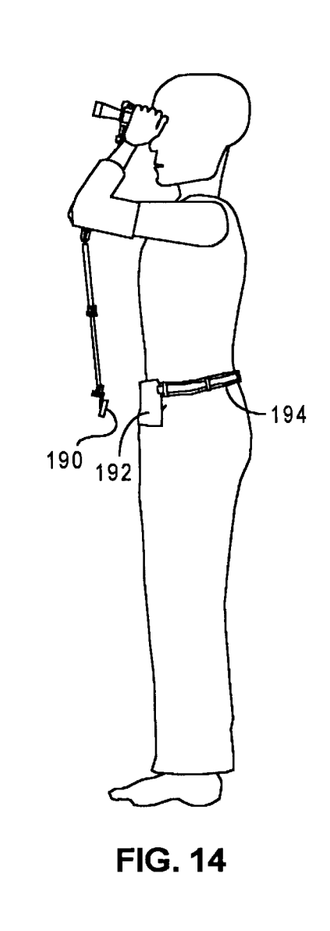
FIG. 14 is similar to FIG. 13, except that the steadying apparatus in this figure has a Velcro strip on the bottom of the elongated member of its arm rest support which is designed to grab onto a corresponding Velcro pad on the hip of the user, and except that the user has rotated the elbow on which the steadying apparatus is mounted up, so as to pull the Velcro strip on the bottom of the elongated support member away from the Velcro pad on his pants.

FIG. 14 is similar to FIG. 13, except that it shows the apparatus 100A after a Velcro strip 190 has been attached to its pocket-belt catch. This Velcro is designed to catch against a pad 192 of a mating Velcro material attached to the front of a user's hip, such as by attachment to a belt 194.

Figure 15:
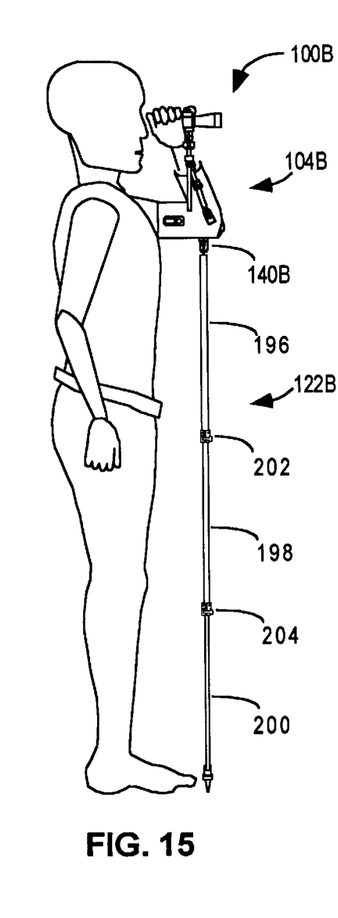
FIG. 15 is similar to FIG. 11, except that it shows an embodiment of the invention in which the arm rest of the steadying apparatus is supported by a monopod.
Figure 16:
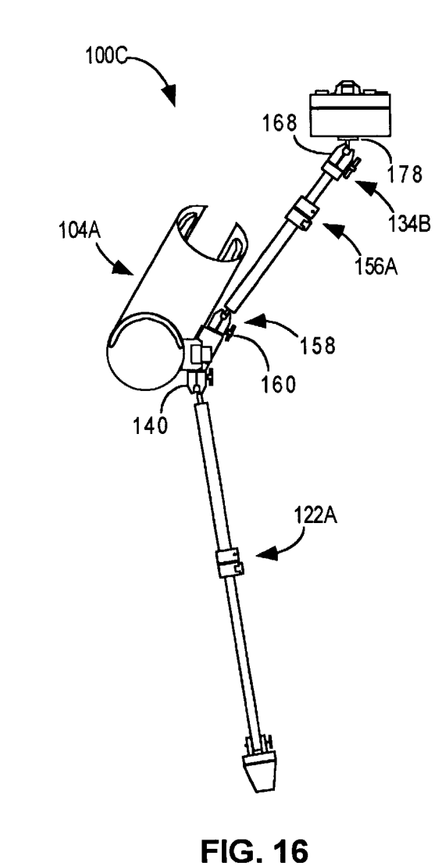
FIGS. 16–18 are similar to FIGS. 7–9 except that the steadying apparatus shown in them has a slightly simpler means of mounting a pointable device relative to the apparatus's arm rest, and except for the fact that the elongated support member in FIGS. 16–18 is connected to the side of the arm rest rather than its bottom.
Figure 17:
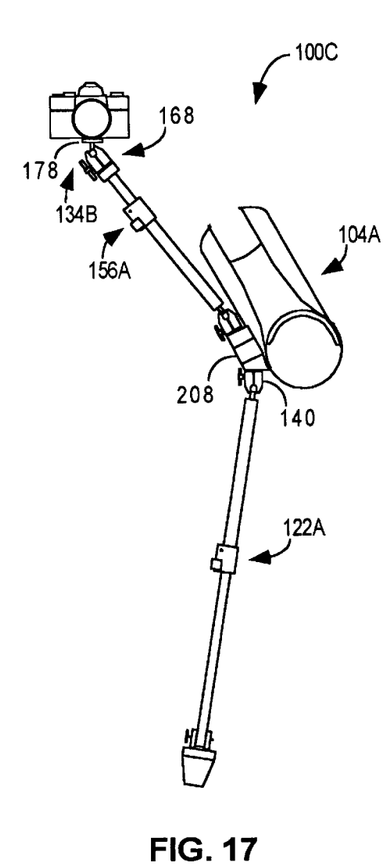
Figure 18:
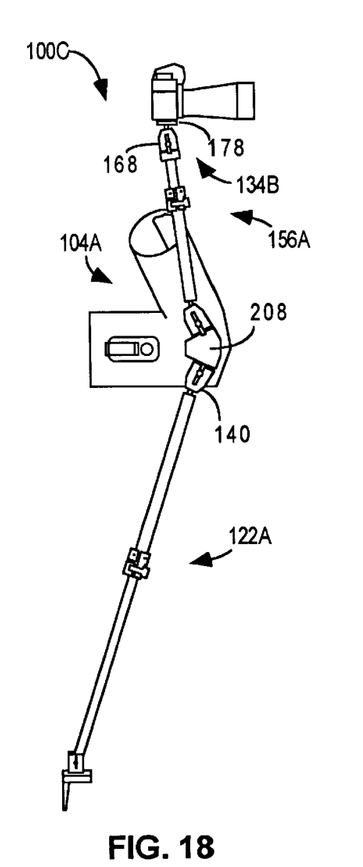

FIG. 15 shows an alternate embodiment of the invention comprised of a steadying apparatus 100B which is identical to the apparatus 100A shown in FIGS. 7–13, except that its arm rest support 122B includes a rigid elongated monopod member mounted at one end of the arm rest 104B. The monopod member is of sufficient length to extend to the ground when the arm rest is approximately at the user's mid-chest or above. The monopod member is mounted to the arm rest with ball joint 140B similar to the ball joint 140 shown in FIG. 7, which can adjustably fix the angle of the monopod member relative to the arm rest 104B. The monopod member is comprised of telescoping tubes 196, 198, and 200, which can be adjustably clamped by claims 202 and 204.

FIGS. 16–19 show a steadying apparatus 100C, which is identical to the apparatus 100A shown in FIGS. 7–13, except for two things. The first difference is that its mounting 134B for a pointable device is much simpler, with its mounting plate 178A being directly supported by a ball joint 168 at the end of a mounting arm 156A, which corresponds to the mounting arm 156 of FIGS. 7–9, except that it is slightly longer. This makes the apparatus 100C simpler, lighter, and easier to walk with than the apparatus 100A of FIGS. 7–13, but it does not provide a mounting for a pointable device which is quite as easy to adjust for pointing at different objects. With the apparatus 100C of FIGS. 16–19 adjusting the height of the mounting plate for differences in height of the object being pointed at requires either adjusting the length of the telescoping arm rest support 122A, or adjusting the angle of both ball joints 158 and 168 and the telescoping length of mounting arm 156A. The apparatus 100A in FIGS. 7–9 allows adjusting the height of its mounting plate merely by unclamping the clamp 171 and adjusting the height of the vertical mounting shaft 172.

Figures 19, 20, 21:
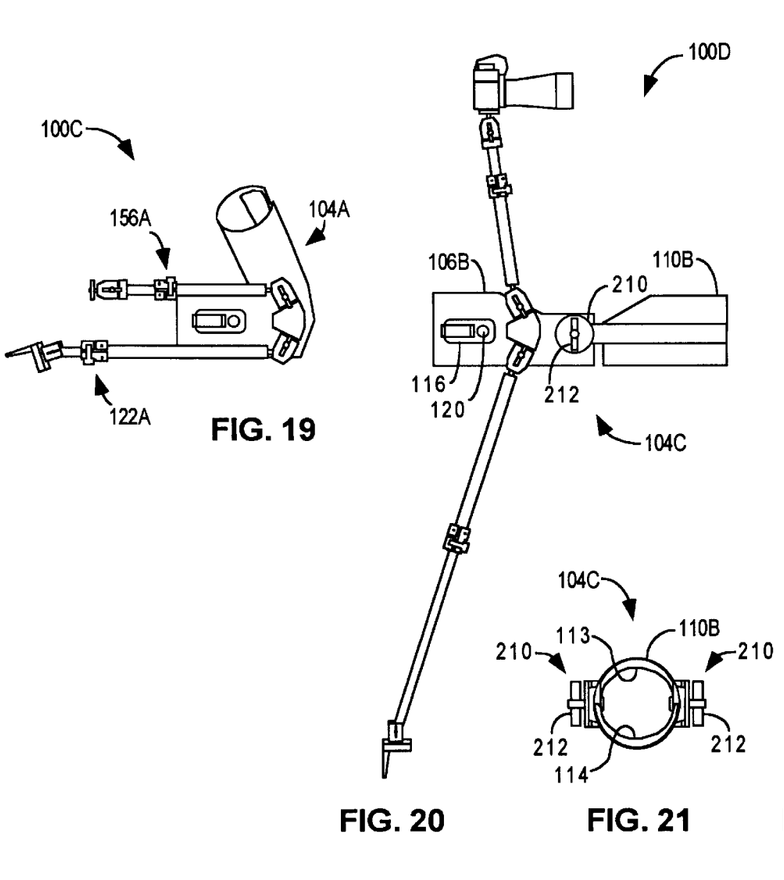
FIG. 19 shows the steadying apparatus of FIGS. 16–18 with the elongated support member and the elongated member for mounting a pointable device folded so as to allow compact storage of the steadying apparatus.
FIG. 20 illustrates a steadying apparatus similar to that in FIGS. 16–19 except that the lower arm holding portion of the apparatus In FIG. 20 is hingably mounted so its axis can be rotated relative to that of the upper arm holding portion so that the upper and lower arm holding portions can be co-axial as shown in FIG. 20 to enable a user to place his or her arm in the arm rest without the need for the opening in the front side of the lower arm holding portion shown in FIGS. 16–19.
FIG. 21 shows the arm rest of the steadying apparatus of FIG. 20, as extended in FIG. 20, from right side of FIG. 20.

The second difference between the steadying apparatus 100C of FIGS. 16–19 and the apparatus 100A of FIGS. 7–13 is that in the apparatus 100C the ball joint 140 mounting the arm rest support 122A is not connected to the bottom of the arm rest 104A, but rather to a block 208 attached to the side of the arm rest, and the ball joint 158 to which the mounting arm is attached is also connected to this block. This allows the arm rest support 122A to be mounted more in front of the vertical centerline of a user's body, allowing it to be supported more centrally on the user's hips without requiring as much of a slant toward that centerline. It also has the advantage of allowing the arm rest support to be folded up more compactly for storage or transport, as is indicated in FIG. 19.

FIGS. 20–23 illustrate yet another embodiment of the invention, a steadying apparatus 100D which is almost identical to the apparatus 100C of FIGS. 16–19, except for one important differences. This difference is that the upper and lower arm holding portions 106B and 110B, respectively, of the apparatus 100D of FIGS. 20–23 are hinged relative to each other at pivoting joints 210 on each side of the upper arm holding portion. This allows the user to vary and adjustably fix the angle at which the arm rest 104C bends a user's elbow. This angle can be fixed by tightening one or both of the thumbscrews 212.

Figures 22, 23:
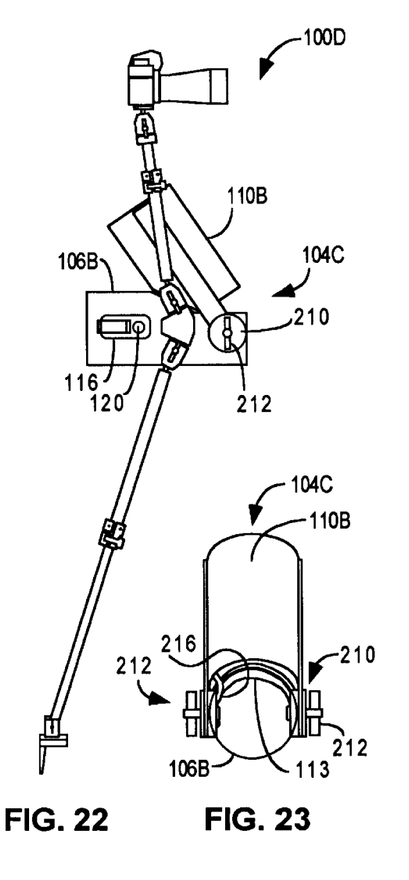
FIG. 22 is identical to FIG. 20, except that is shows the steadying apparatus after its lower arm holding portion has been bent upward so as to form an angle with the upper arm holding portion.
FIG. 23 shows the arm rest of the steadying apparatus of FIGS. 20–22, with the lower arm holding portion folded back as shown in FIG. 22, viewed from the right side of FIG. 22.

FIGS. 20 and 22 show the entire steadying apparatus 100D, and FIGS. 21 and 23 show only the arm rests 104C of that apparatus. FIGS. 20 and 21 show the arm rest 104C with its upper and lower arm holding portions positioned to have a zero angle between their axes. FIGS. 22 and 23 show the arm holding portions with approximately a one hundred and twenty degree angle between their axis. It should be understood that the adjustably fixable pivoting joints 210 allow the angle between the arm holding portions to be fixed at any angle between zero and approximately one hundred and twenty degrees.

One of the advantage of such a hinging arm rest is that it allows both the upper and lower arm holding portions to completely surround a user's upper and lower arm, respectively, while allowing the user to easily put on and take off the arm rest. This is because the user can easily insert his arm though the arm rest while its two arm holding portions are co-axial, as shown in FIGS. 20 and 21. Then the user can bend the lower arm holding portion back as shown in FIGS. 22 and 23 and tighten the thumbscrews 212.

The steadying device 100D includes an air bag 113 in the top of its upper arm holding portion 106B and an air bag 114 in the bottom or front of the lower arm holding portion 110B. These can be quickly inflated and de-inflated, respectively, by a pump 116 and quick release button 120 similar to those discussed above. To supply and remove air under pressure to the air bag 114 in the lower arm holding portion 110B a tube 216 shown in FIG. 23 connects between that air bag and the pump and quick release valve. This tube is allowed to bend with the hinging of the lower arm holding portion relative to the upper arm holding portion.

Figure 24:
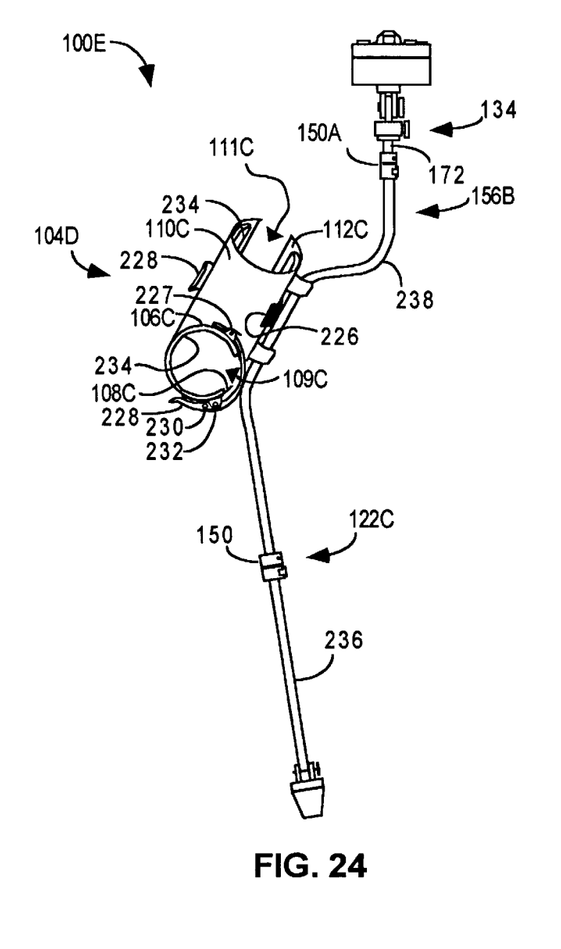
FIGS. 24 and 25 are similar to FIGS. 16 and 18 except that they show an alternate embodiment of the present invention in which both the upper and lower arm holding portions of the arm rest have an adjustable latch for tightening the each such arm holding portion around an arm placed within it, and in which support for the arm rest and for the pointable device are different.
Figure 25:
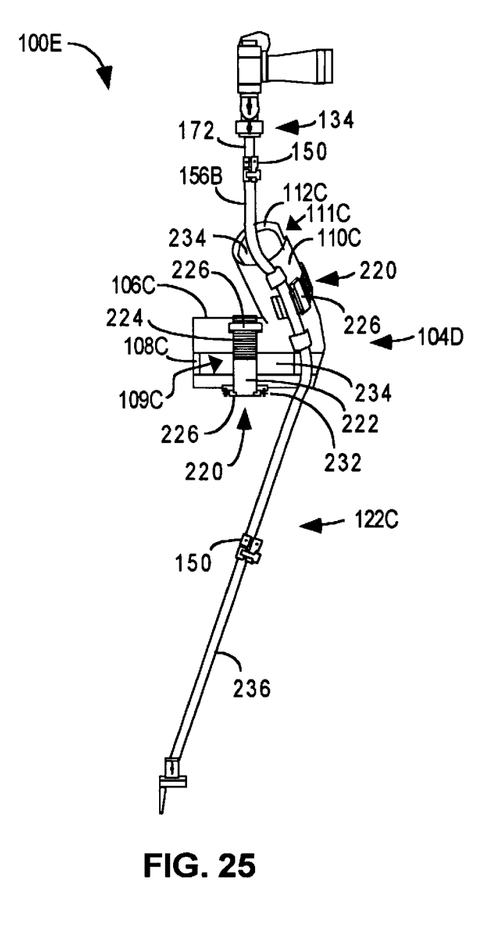
Figure 26:
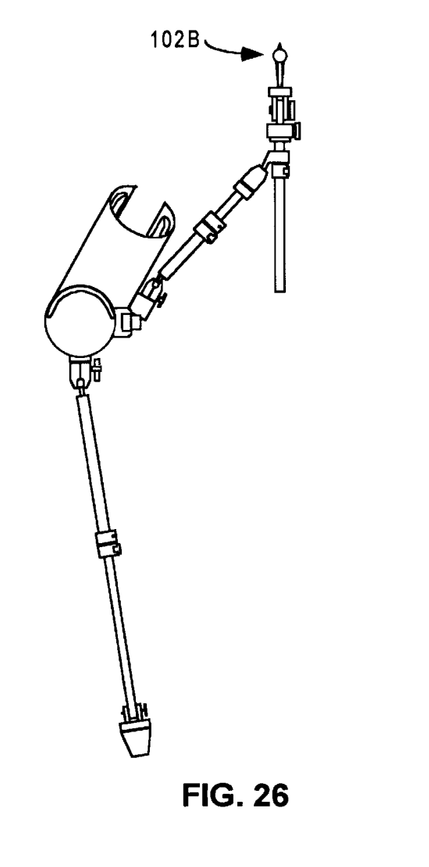
FIGS. 26–31 are similar to FIGS. 7–12, except that in them the pointable device mounted on the steadying apparatus is a rifle instead of a camera.
Figure 27:
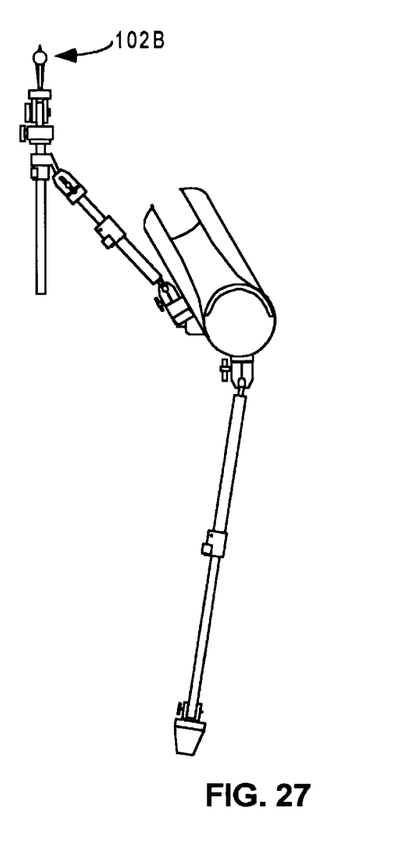
Figure 28:
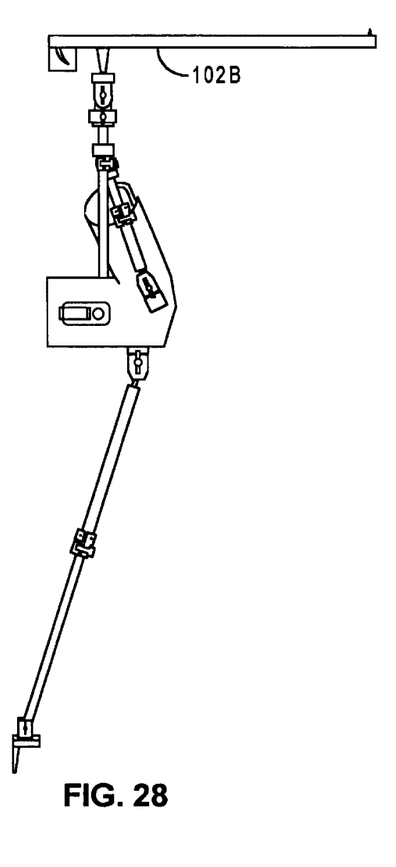
Figure 29:
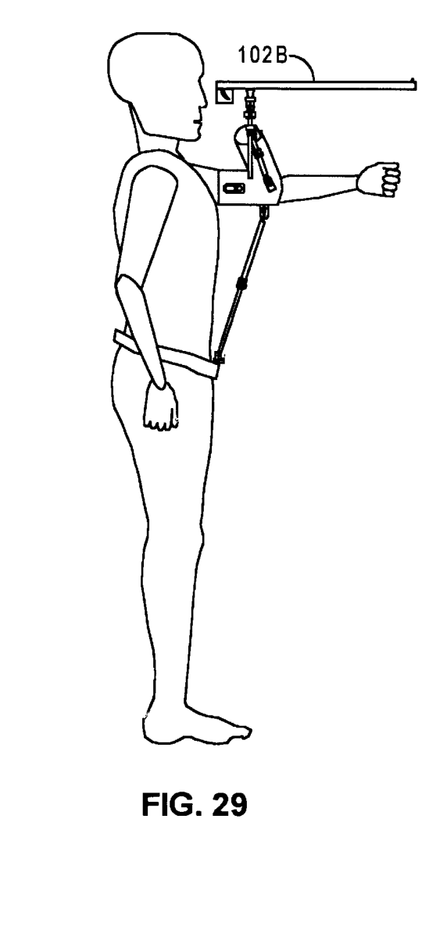
Figure 30:
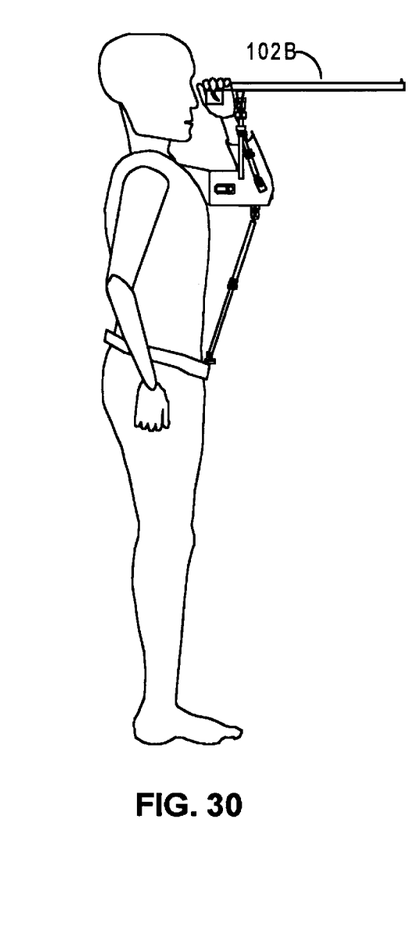
Figure 31:
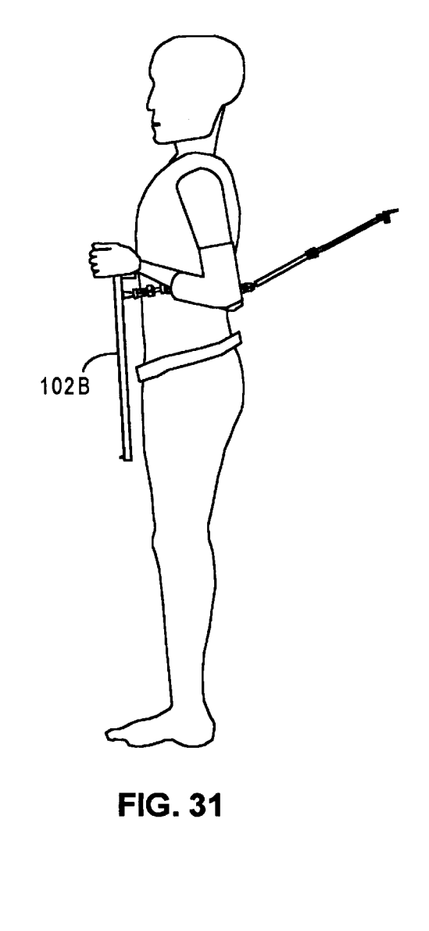

FIGS. 24 and 25 show yet another embodiment of the invention, a steadying apparatus 100E. The apparatus 100E differs from any of the previously described embodiments in several ways.

First, the upper and lower arm holding portions, 106C and 110C of the apparatus 100E are designed to firmly hold a user arm with adjustable clamping latches 220, rather than by means of air bags as in all the embodiments discussed above. The generally cylindrical surfaces 108C and 112C, respectively, of the upper and lower arm holding portions 106C and 110C each have an opening 109C and 111C, respectively, which runs along the length of that cylindrical surface in a direction parallel to its axis. The walls of the upper and lower arm holding portion are made of a relatively flexible plastic which can bend to effectively alter the radius of the generally cylindrical inner surfaces of those arm holding portions.

The clamping latches 220 are similar to such latch used on some in-line skates. They each include a flexible strap 222 which includes a series of ridges 224 which run perpendicular to the strap's length. These ridges act like the teeth of a ratchet. A releasable pawl 226 is mounted on one side of each arm holding portion's opening so that the strap and its ridges can be passed under the pawl so the pawl with grab the ridges and prevent the strap from being withdrawn. The Pawl is rotatably mounted about a pin 227 so that if the user presses down on the opposite end of the pawl from that which grabs the ridges, the pawl will be lifted out from the ridges and will let the strap be withdrawn from underneath it. The opposite end of the strap 222 rotates on a pin 230 mounted on a latch 228. The latch, in turn, is rotates about a pin 232 mounted on the outer wall of its associated arm holding portion on the opposite side of that arm holding portion's opening from the pawl 226.

When the user inserts the strap under the pawl, the latch 228 is rotated about the pin 232 so as to move the end of the strap connected to the latch closer to the opening. Then the user rotates the latch in the opposite direction, which pulls the strap tight, compressing the flexible plastic of its arm holding portion about an arm placed within it, and causing the latch to lock. The user can then unlatch the strap at any time merely by pulling up on the opposite end of the latch and then removing the strap from under the pawl.

The generally cylindrical inner surfaces of both the upper and lower arm holding portions are provided with a lining 234 containing foam rubber to cause a relatively even application of pressure around the arm of the user.

The steadying apparatus 100E also differs from the apparatuses 100A–C in that its arm rest support 122C and its mounting arm 156B are both permanently fixed to its arm rest 104D. The arm rest support 122C includes a telescoping tubular extension 236, so the length of that support can be fixabily adjusted by means of a clamp 150. The mounting arm is formed of the same metal tube which forms the top of the arm rest support. It includes a curve 238 which enables its upper portion to extend in a vertical direction when the steadying device is being used. A mounting 134 identical to that shown in FIGS. 7–9 is slidably mounted in the top of the mounting arm's tube. A clamp 150A is used to adjustably fix the height of the mounting shaft 172 relative to the mounting arm and the arm rest to which it is attached.

Although the apparatus 100E of FIGS. 24 and 25 is not as adjustable as the apparatus 100A shown in FIGS. 7–9, it is simpler, more rugged, easier to walk with, and, assuming its mounting arm is approximately of the right shape and height for a given user and pointable device, it provides all the adjustment needed for pointing at different objects.

FIGS. 26–31 correspond to FIGS. 7–12, except that the pointable device is a gun 102B. The gun shown in FIGS. 26–31 is a rifle with its stock removed. The user can aim and fire the gun with one hand if desired since the steadying device provides support for the rifle.

It should be understood that the foregoing description and drawings are given merely to explain and illustrate the invention and that the invention is not limited thereto, except insofar as the interpretation of the appended claims are so limited. Those skilled in the art who have the disclosure before them will be able to make modifications and variations therein without departing from the scope of the invention.

For example, it should be understood that in other embodiments of the invention the inner surface of the upper and lower arm holding portions need not be cylindrical, but could be some other shape. In other embodiments the bottom of the arm rest support could be supported at the user's hip by other than a normal belt, a normal pocket, or Velcro pad. For example a user could wear a special belt having a pocket or receptacle especially made to catch and support the lower end of an arm rest support.

It should also be understood that other embodiments of the invention can comprise different combinations of the features shown in the different embodiments discussed above.

In other embodiments of the invention in which the pointable device is a gun, the gun will be mounted to the steadying apparatus closer to the gun's center of gravity than is shown in FIGS. 26–31, and a hand grip will be placed behind and below the gun's trigger to make it easier for the user to point the gun while keeping his or her fingers off the trigger. Other embodiments of the invention can be designed for use with rifles having stocks. In such embodiments the arm rest can be used to support the arm of a marksman which holds the front of a rifle and the angle at which the upper and lower arm holding portions bend an elbow will be much less than ninety degrees.

Other embodiments of the invention can be specially designed for use with other pointable devices, including crossbows, longbows, and lasers.

What we claim is:

1. An apparatus for helping a user to more steadily hold a pointable device which is to be aimed by the user's hand comprising:

an arm rest including:
an upper arm holding portion having a surface for supporting the user's upper arm from below; and
a lower arm holding portion having a surface for restricting rotation of the user's lower arm when the lower arm is bent at the elbow; and
a support connected to the arm rest for supporting the arm rest from below.

2. An apparatus as in claim 1 wherein:
each of said upper and lower arm holding portions includes means for pressing against a given portion of a user's arm within said arm holding portion from a sufficient plurality of directions around the circumference of said given arm portion so as to retard motion of said given arm portion in any direction perpendicular to said given arm portion's axis; and
said arm rest includes means for fixing said upper and lower arm holding portions relative to each other.

3. An apparatus as in claim 2:
wherein at least one of said arm holding portions includes one or more inflatable air bags, which, when inflated, increase the firmness with which their corresponding arm holding portion holds a portion of an arm which is in said arm holding portion; and
further including means for enabling a user to selectively inflate and deflate said air bags.

4. An apparatus as in claim 2 wherein said upper and lower arm holding portions each include a generally cylindrical inner surface, with the axes of the generally cylindrical surfaces of said two arm holding portions forming an angle such that an arm which is held within each such arm holding portion is bent at the elbow by at least 60 degrees.

5. An apparatus as in claim 4 wherein:
the cylindrical surface of said upper arm holding portion extends substantially all the way around the portion of a user's arm placed within in it, so such an arm cannot be withdrawn from said upper arm holding portion in a direction perpendicular to the axis of said arm holding portion's cylindrical surface; and
the cylindrical surface of said lower arm holding portion does not extend all the way around a portion of a user's arm placed within it, but rather has an opening which extends in a direction parallel to the axis of said cylindrical surface, so the user can insert and remove his lower arm from the lower arm holding portion by rotating the lower arm about the elbow.

6. An apparatus as in claim 5 wherein said opening in the cylindrical surface of the lower arm holding portion is in the side of said surface which faces away from the shoulder of a user who has his upper arm inside the upper arm holding portion, so such a user can insert and remove his lower arm from the lower arm holding portion by bending his or her lower arm, respectively, toward or away from his or her shoulder.

7. An apparatus as in claim 1 wherein said support includes a rigid elongated member connected at one end to said arm rest and being of a sufficient length to extend to the hip of the user when supporting said arm rest at least as high as the user's mid chest.

8. An apparatus as in claim 7 wherein said rigid elongated member has connected to its bottom:
a flat, downward-extending portion for fitting into a front pocket of a pair of pants or behind a belt; and
a horizontal surface above the downward-extending portion designed for catching the top of such a belt or pocket.

9. An apparatus as in claim 8 wherein said flat downward-extending portion is mounted to rotate relative to the end of the elongated member.

10. An apparatus as in claim 7 wherein said rigid elongated member has attached to its lower end a Velcro strip designed to attach to a corresponding mating Velcro strip attached to a user's hips.

11. An apparatus as in claim 7 further including means for mounting said rigid elongated member at a fixed angle relative to said arm rest which slants down and in from said arm rest, when said arm rest is held out in front of a user's chest, toward said user's hip.

12. An apparatus as in claim 11 wherein said means for mounting the rigid elongated member at a fixed angle includes means for enabling a user to adjustably fix said angle.

13. An apparatus as in claim 7 wherein said rigid elongated member includes telescoping means for enabling a user to adjustably fix the length of said member between said arm rest and a user's hip.

14. An apparatus as in claim 1 wherein:
said support includes means for supporting said arm rest so that said lower arm holding portion extends in a diagonal direction which points both upward from the upper arm holding portion and toward a position in front of the user's face, so that if the elbow is extended out in front of the user's shoulder, the user's hand can be placed in front of the users face;
said lower arm holding portion includes a diagonal surface for supporting a user's lower arm from below when it is placed within said lower arm holding portions; and
said support includes means for supporting the diagonal angle of said diagonal surface.

15. An apparatus as in claim 1 wherein said support includes a rigid elongated monopod member mounted at one end on said arm rest and of sufficient length to extend to the ground when the arm rest is approximately at the user's mid-chest or above.

16. An apparatus as in claim 1:
wherein said pointable device to be aimed by the user's hand is an optical device through which the user can look; and
further including a mounting for said optical device which is supported by said support.

17. An apparatus as in claim 16 wherein said mounting includes means for mounting the optical device so it can be rotated with two degrees of freedom so as to better allow the hand of the user supported by said arm rest to aim it.

18. An apparatus as in claim 16 wherein said mounting includes means for adjustably fixing the height of the optical device relative to the arm rest.

19. An apparatus as in claim 16 wherein said mounting includes an elongated member supported by said support which can extend upward at an adjustable angle, and means for enabling a user to adjustably fix said angle at which said elongated member extends upward.

20. An apparatus for helping a user to more steadily hold an optical device to be aimed by the user's eye comprising:

a mounting for such an optical device; and a support for supporting the mounting at least as high as the user's mid-chest so the user can look through the optical device to aim it, said support including means for supporting the mounting from the user's hip, but not from his or her chest, said means including a rigid elongated member extending between the mounting and the hip of the user.

21. An apparatus as in claim 20 wherein said rigid elongated member has connected to its bottom:

a flat, downward-extending portion for fitting into a front pocket of a pair of pants or behind a belt; and a horizontal surface above the downward-extending portion designed for catching the top of such a belt or pocket.

22. An apparatus as in claim 20:

further including an arm rest for supporting a user's elbow; and wherein said support also supports said arm rest from the user's hips.

23. An apparatus for helping a user to more steadily hold an optical device to be aimed by the user's eye comprising:

a mounting for such an optical device; and a support for supporting the mounting at least as high as the user's mid-chest so the user can look through the optical device to aim it, said support including means for supporting the mounting from the user's hip, but not from his or her chest, said means including a rigid elongated member extending between the mounting and the hip of the user;

wherein said rigid elongated member has attached to its lower end a Velcro strip designed to attach to a corresponding mating Velcro strip attached to a user's hips.

24. An apparatus for helping a user to more steadily hold an optical device to be aimed by the user's eye comprising:

a mounting for such an optical device; and a support for supporting the mounting at least as high as the user's mid-chest so the user can look through the optical device to aim it, said support including means for supporting the mounting from the user's hip, but not from his or her chest, said means including a rigid elongated member extending between the mounting and the hip of the user;

an arm rest for supporting a user's elbow;

wherein said support also supports said arm rest from the user's hips; and said arm rest includes an upper arm holding portion having a surface for supporting a user's upper arm from below and a lower arm holding portion having a surface for restricting rotation of the user's lower arm about the elbow when the lower arm is bent at the elbow.

25. An apparatus for helping a user to more steadily hold a pointable device which is to be aimed by the user's eye and hand comprising:

an arm rest including an upper arm holding portion having a surface for supporting a user's upper arm from below and a lower arm holding portion having a surface for restricting rotation of the user's lower arm about the elbow when the lower arm is bent at the elbow;

a support connected to the arm rest for supporting the arm rest from below; and means for mounting said pointable device at a position so that it can be aimed by the hand of a user's arm which has its upper and lower portions held by said upper and lower arm holding portions, respectively.

26. An apparatus as in claim 25 wherein said mounting means includes means for adjustably fixing the height of the mounting relative to the arm rest.

27. An apparatus as in claim 25 wherein said mounting means includes an elongated member supported by said support which can extend upwardly at an adjustable angle, and means for enabling a user to adjustably fix said angle at which said elongated member extends upward.

28. An apparatus as in claim 25 wherein:

each of said upper and lower arm holding portions includes means for pressing against a given arm portion within said arm holding portion from a sufficient plurality of directions around the circumference of said given arm portion so as to retard motion of said given arm portion in any direction perpendicular to said given arm portion's axis; and said arm rest includes means for fixing said upper and lower arm holding portions relative to each other.

29. An apparatus as in claim 25 wherein said support includes a rigid elongated member connected at one end on said arm rest and of a proper length to extend to the hip of the user from said connection to said arm rest when said arm rest is attached to an elbow extended out in front of the user's shoulder and said mounting means is in a position so as to enable the user to look through said pointable device.

30. An apparatus as in claim 25 wherein said support includes a rigid elongated monopod member connected at one end to said arm rest and of sufficient length to extend to ground when the arm rest is approximately at the user's mid-chest or above.

* * * * *